(12) United States Patent
Mun et al.

(10) Patent No.: US 6,565,266 B2
(45) Date of Patent: May 20, 2003

(54) DEVICE FOR ALIGNING OPTICAL SOURCE AND OPTICAL FIBER IN OPTICAL SOURCE MODULE

(75) Inventors: Gi-Tae Mun, Pusan-kwangyokshi (KR); Ki-Soo Park, Kyongsangbuk-do (KR); Oh-Dal Kwon, Kyonggi-do (KR); Young-Soo Yang, Seoul (KR); Dae-Hyun Kang, Kwangju-kwangyokshi (KR)

(73) Assignee: Samsung Electronics Co., Ltd., Suwon (KR)

( * ) Notice: Subject to any disclaimer, the term of this patent is extended or adjusted under 35 U.S.C. 154(b) by 105 days.

(21) Appl. No.: 09/863,790

(22) Filed: May 23, 2001

(65) Prior Publication Data

US 2002/0015566 A1 Feb. 7, 2002

(30) Foreign Application Priority Data

Aug. 1, 2000 (KR) ......................................... 2000-44531

(51) Int. Cl.[7] .............................. G02B 6/42; G02B 6/00
(52) U.S. Cl. ......................... 385/88; 385/137; 385/136; 385/91
(58) Field of Search ............................. 385/88, 90, 91, 385/92, 134, 136, 137

(56) References Cited

U.S. PATENT DOCUMENTS 6,190,056 B1 * 2/2001 Kwon et al. .................. 385/91
2002/0025126 A1 * 2/2002 Finot et al. .................. 385/134

* cited by examiner

Primary Examiner—Hemang Sanghavi
Assistant Examiner—Omar Rojas
(74) Attorney, Agent, or Firm—Cha & Reiter

(57) ABSTRACT

Disclosed is a device for aligning an optical source and an optical fiber in an optical source module. The optical source module has a substrate, an optical source mounted on the substrate, an optical fiber for receiving lights emitted by the optical source, an optical fiber ferrule for supporting the optical fiber, and a saddle mounted on the substrate for holding the optical fiber ferrule. The saddle comprises a pair of base layers distanced apart from each other so that the optical fiber ferrule can be inserted thereto; a sub-rib member extending upwardly from internal ends of the respective base layer; a center-rib member extending in a vertical upward direction from the center of the respective sub-rib member; an arm member displaced along the longitudinal direction of the optical fiber ferrule, and having a pair of welded sections for coupling the optical fiber ferrule thereto; a tapered reinforcing member extending from the respective arm member; and, a loop member having a bent shape coupled to both ends of the reinforcing sections.

4 Claims, 11 Drawing Sheets

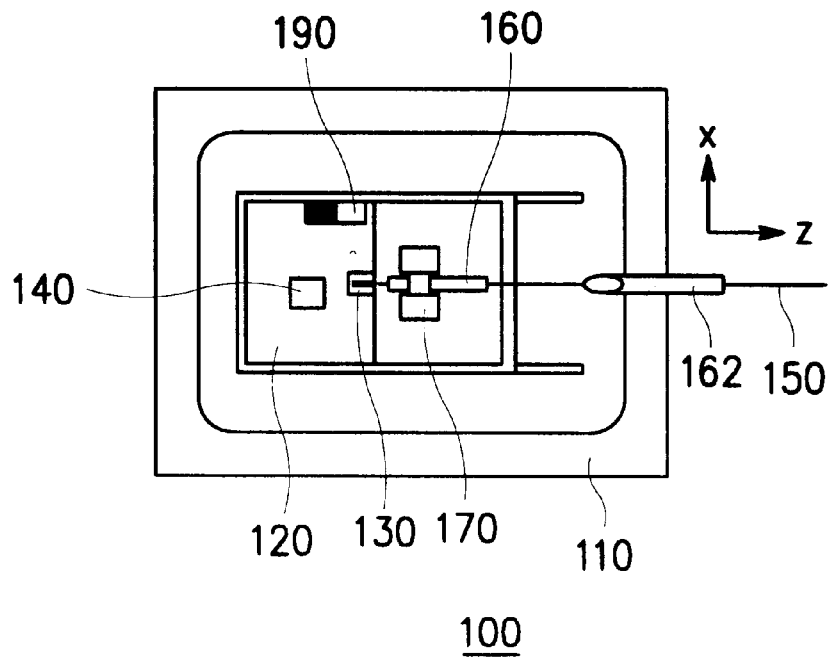
FIG. 1A [PRIOR ART]
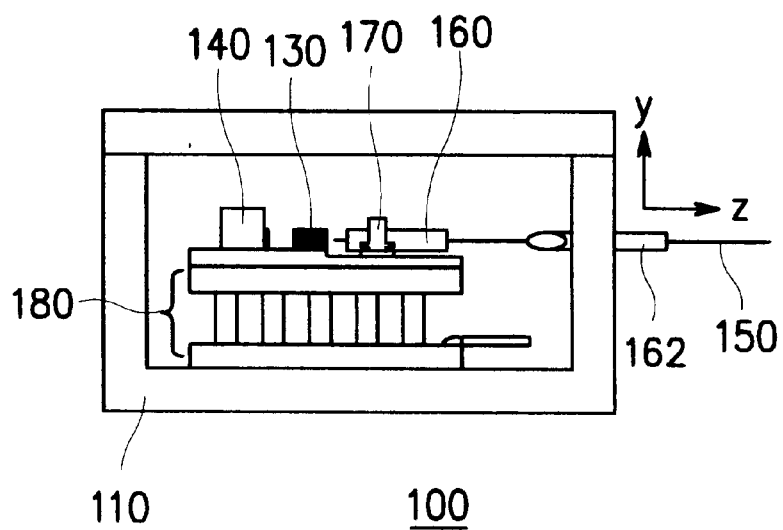
FIG. 1B [PRIOR ART]

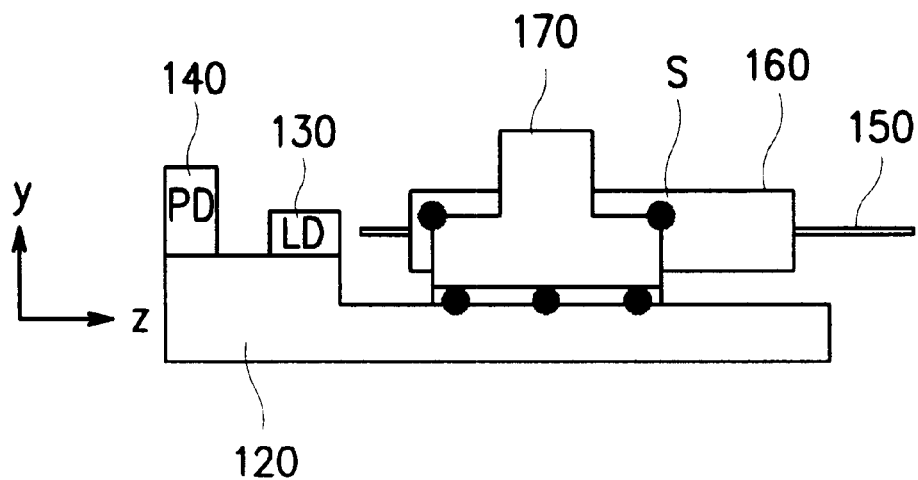
FIG. 2A [PRIOR ART]
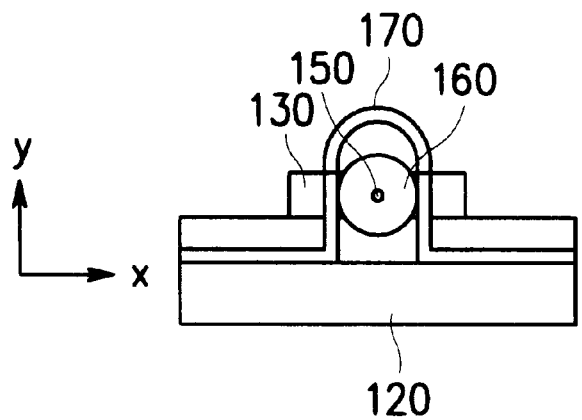
FIG. 2B [PRIOR ART]

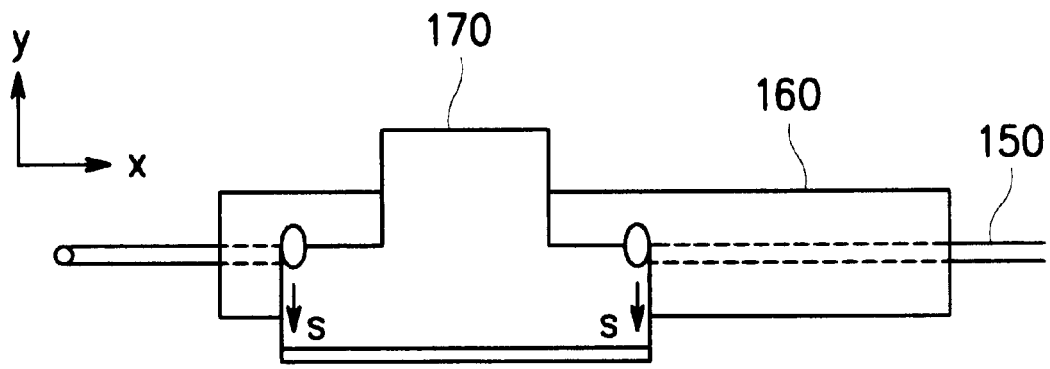
FIG. 3 [PRIOR ART]
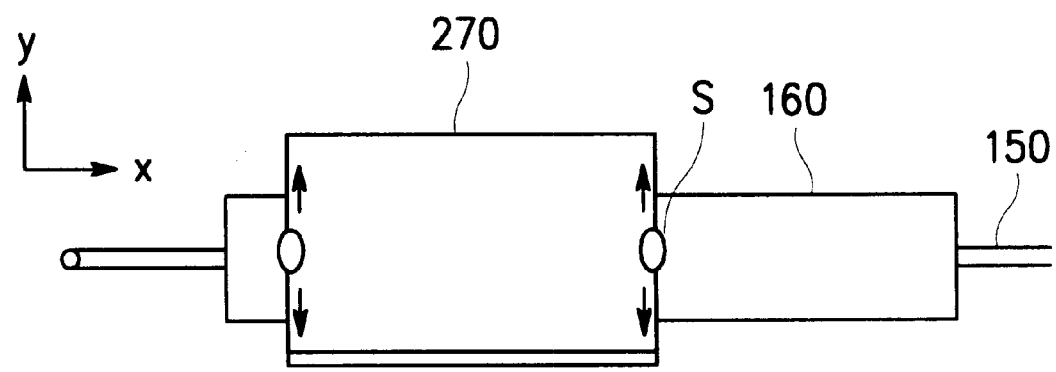
FIG. 4 [PRIOR ART]

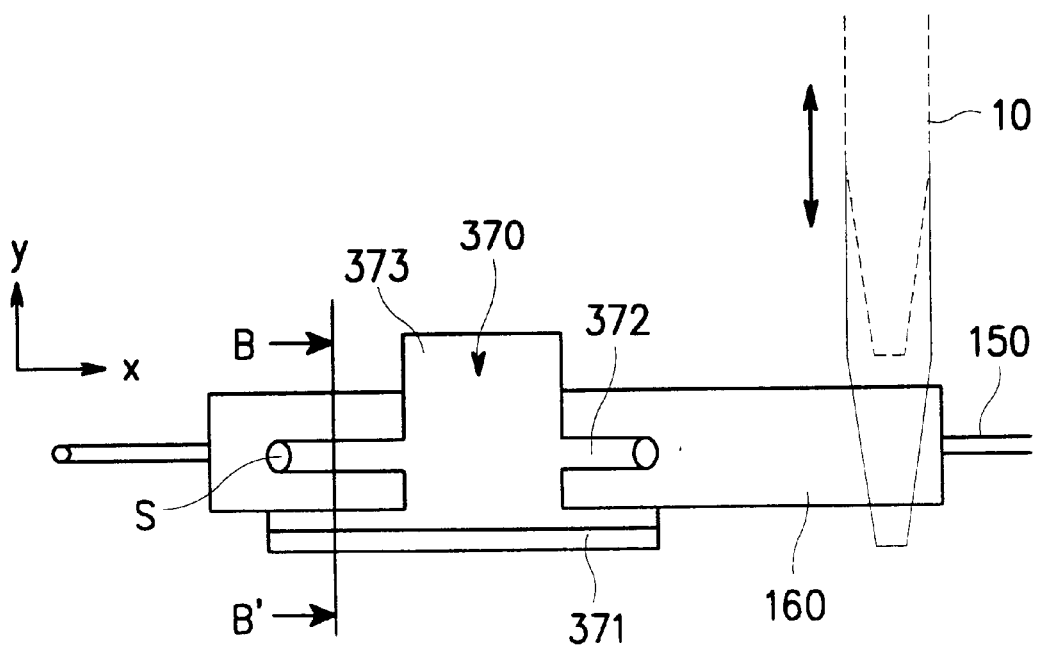
FIG. 5A [PRIOR ART]
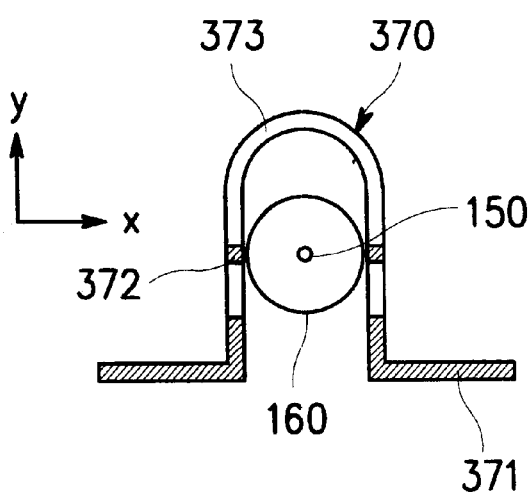
FIG. 5B [PRIOR ART]

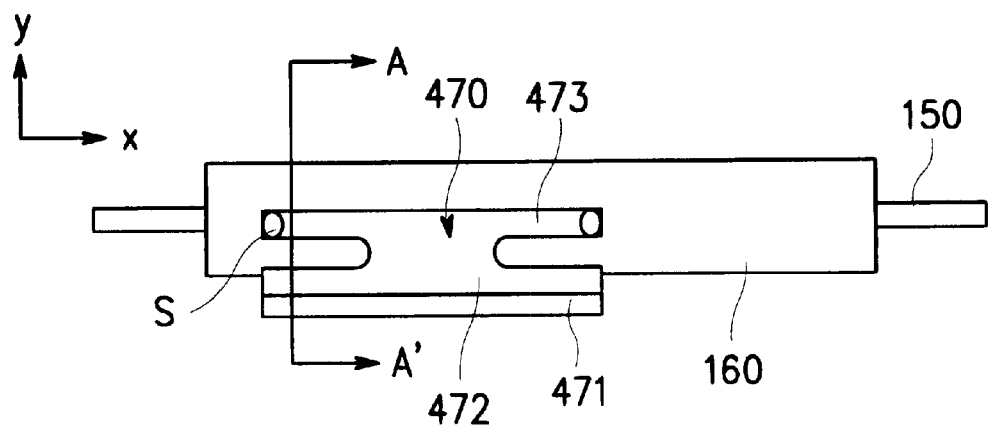
FIG. 6A [PRIOR ART]
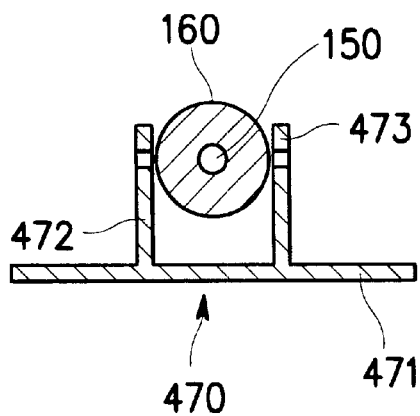
FIG. 6B [PRIOR ART]

DEVICE FOR ALIGNING OPTICAL SOURCE AND OPTICAL FIBER IN OPTICAL SOURCE MODULE

CLAIM OF PRIORITY

This application claims priority to an application entitled "Device for Aligning Optical Source and Optical Fiber in Optical Source Module" filed with the Korean Industrial Property Office on Aug. 1, 2000 and there duly assigned Ser. No. 2000-44531.

BACKGROUND OF THE INVENTION

1. Field of the Invention

The present invention relates generally to an optical source module and, in particular, to a device for aligning an optical source and an optical fiber in the optical source module.

2. Description of the Related Art

In general, the function of an optical source module is essential in all aspects of transmitting and receiving an optical signal in an optical communications system. Namely, an optical source module is typically used as a pump laser diode module, semiconductor optical-amplifier module, and for transmitting/receiving module in the range of 155 Mbit and 2.5 Gbit.

FIG. 1a is a top view illustrating the construction of a conventional optical source module. FIG. 1b is a side view illustrating the construction of the conventional optical source module. As shown in FIGS. 1a and 1b, the conventional optical source module 100 comprises a housing 110, a substrate 120, a laser diode 130, a photo diode 140, an optical fiber 150, an optical ferrule 160, a saddle 170, a thermoelectric cooler 180, a thermister 190, and, a window ferrule 162.

According to the conventional optical source module 100 with the above construction, the laser diode 130 and an optical fiber 150 are aligned according to the following steps. First, the laser diode 130 is mounted on the substrate 120. Then, the optical fiber 150 and the optical ferrule 160 are soldered together, and the lower portion of the saddle 170 is mounted on the substrate 120. Thereafter, when electric power is supplied to the laser diode 130 to emit light, the position of the optical ferrule 160 is adjusted to realize a maximum light-receiving position. Once the maximum light-receiving position is determined, the saddle 170 and the optical ferrule 160 are welded together. Here, the thermal distortion caused by this welding process should be within an alignment allowable error range.

In order to obtain a higher optical coupling efficiency between the optical fiber and the laser diode, a lens having the same shape as archenterons of the laser diode is processed at one end of the optical fiber for a precise alignment in six axes. Here, the error range of an axis should be within the least allowable error range, which is preferably less than 0.2 µm.

FIG. 2a is a side view illustrating a device for aligning an optical source and an optical fiber according to a first embodiment of the conventional art. FIG. 2b is a front view of the device in FIG. 2a. FIG. 3 is a side view magnifying an optical ferrule and saddles of the device in FIG. 2a. FIG. 4 is a side view magnifying an optical ferrule and saddles of the device in accordance with a second embodiment of the conventional art.

Referring to FIGS. 2a to 4, the saddles 170 and 270 of the device for aligning the optical source and the optical fiber according to the first and second embodiments of the conventional art are thermally distorted to a degree of 5 to 20 µm in an y-axis (vertical) direction due to the heat applied to the respective welded sections S. Once the heat is applied to the welded sections S, the heat is conducted toward the arrow direction, as shown in FIGS. 3 and 4. Also, as the optical ferrule 160 including the optical fiber 150 is displaced downward in a vertical direction, the vertically-downward displacement of the optical ferrule 160 decreases optical coupling efficiency between the optical source and the optical fiber, thereby impeding reliability of the optical source module.

FIG. 5a is the side view of a device for aligning an optical source and an optical fiber according to a third embodiment of the conventional art. FIG. 5b is a view illustrating the cross section line B-B' in FIG. 5a. FIG. 6a is a side view of the device for aligning an optical source and an optical fiber according to a forth embodiment of the conventional art. FIG. 6b is a view illustrating the cross section line A-A' in FIG. 6a. FIG. 7 is a graph illustrating the thermal distortion of the device according to the third and forth embodiments of the conventional art. Here, the horizontal axis represents time, while the vertical axis represents the degree of thermal distortion, respectively.

Referring to FIGS. 5a to 6b, the saddles 370 and 470 of the device according to the third and forth embodiments of the conventional art includes arms 372 and 473 formed with distance from bases 371 and 471, respectively. In this prior art system, the saddles 370 and 470 exhibit a relatively small value of 0.4 µm in thermal distortion in the y-axis direction as shown in FIG. 7.

However, the degree of thermal distortion is greater than the allowable error range, which should be less than 0.2 µm for thermal distortion in the vertical direction for optimal performance. In order to obtain an optimal error range, the optical ferrule 160 is frequently removed using a gripper to re-align the optical ferrule 160, and such an operation is a time-consuming process and cumbersome during the manufacturing process. Moreover, a residual stress which occurs during the fabrication process should be minimized to enhance the durability of the optical source module. Thus, it is apparent that a need exists for improved techniques for packaging optical modules, such that internal fiber connections can be utilized without increased manufacturing cost, decreased reliability and other problems associated with a conventional optical source module.

SUMMARY OF THE INVENTION

The present invention is directed to a device for aligning an optical source and an optical fiber in an optical source module to minimize a thermal distortion and residual stress caused by the welding of the optical fiber ferrule and the saddle member.

The present invention is related to a device for aligning an optical source and an optical fiber in an optical source module to maintain a higher optical coupling efficiency without re-alignment after the first alignment attempt between the optical source and the optical fiber.

Accordingly, the present invention provides a device capable of aligning an optical source and an optical fiber in an optical source module, which includes a substrate for mounting the optical source, an optical fiber ferrule for supporting the optical fiber so that the optical fiber can receive light emitted from the optical source, and a saddle mounted on the substrate near the optical source for supporting the optical fiber ferrule. The saddle includes a pair of base layers spaced a part by a predetermined distance; a sub-rib member near extending upwardly from the inner end, adjacent to the optical fiber ferrule, of the respective base layer; a center-rib member having a smaller width than the sub-rib layer extending upwardly from the center portion of the respective sub-rib layer; an arm member having a greater width than the center rib extending upwardly from the top of the respective center-rib member, the respective arm member having a pair of welded area positioned at both ends for coupling the optical fiber ferrule along a longitudinal direction of the optical fiber ferrule; a reinforcing member having tapered ends extending upwardly from the top portion of the respective arm member; and, a loop member for coupling the top end of the respective reinforcing member together.

BRIEF DESCRIPTION OF THE DRAWINGS

The foregoing and other features, and advantages of the invention will be apparent from the following, more detailed description of preferred embodiments as illustrated in the accompanying drawings in which reference characters refer to the same parts throughout the various views. The drawings are not necessarily to scale, the emphasis instead placed upon illustrating the principles of the invention.

FIG. 1a is a top view illustrating the construction of a conventional optical source module.

FIG. 1b is a side view illustrating the construction of a conventional optical source module;

FIG. 2a is a side view illustrating a device for aligning an optical source and an optical fiber according to a first embodiment of the conventional art;

FIG. 2b is a front view illustrating the device for aligning an optical source and an optical fiber in FIG. 2a;

FIG. 3 is a side view illustrating an optical ferrule and a saddle of the device for aligning the optical source and the optical fiber in FIG. 2a;

FIG. 4 is a side view illustrating an optical ferrule and a saddle according to a second embodiment of the conventional art;

FIG. 5a is a side view illustrating an optical ferrule and a saddle according to a third embodiment of the conventional art;

FIG. 5b is a view of the cross-section line B-B' in FIG. 5a;

FIG. 6a is a side view illustrating an optical ferrule and a saddle according to a forth embodiment of the conventional art;

FIG. 6b is a view of the cross-section line A-A' in FIG. 6a;

DETAILED DESCRIPTION OF THE PREFERRED EMBODIMENT

A preferred embodiment of the present invention will be described hereinbelow with reference to the accompanying drawings. In the following description, for purposes of explanation rather than limitation, specific details are set forth such as the particular architecture, interfaces, techniques, etc., in order to provide a thorough understanding of the present invention. For the purpose of clarity, well-known functions or constructions are not described in detail since they would obscure the invention in unnecessary detail.

Figure 7:
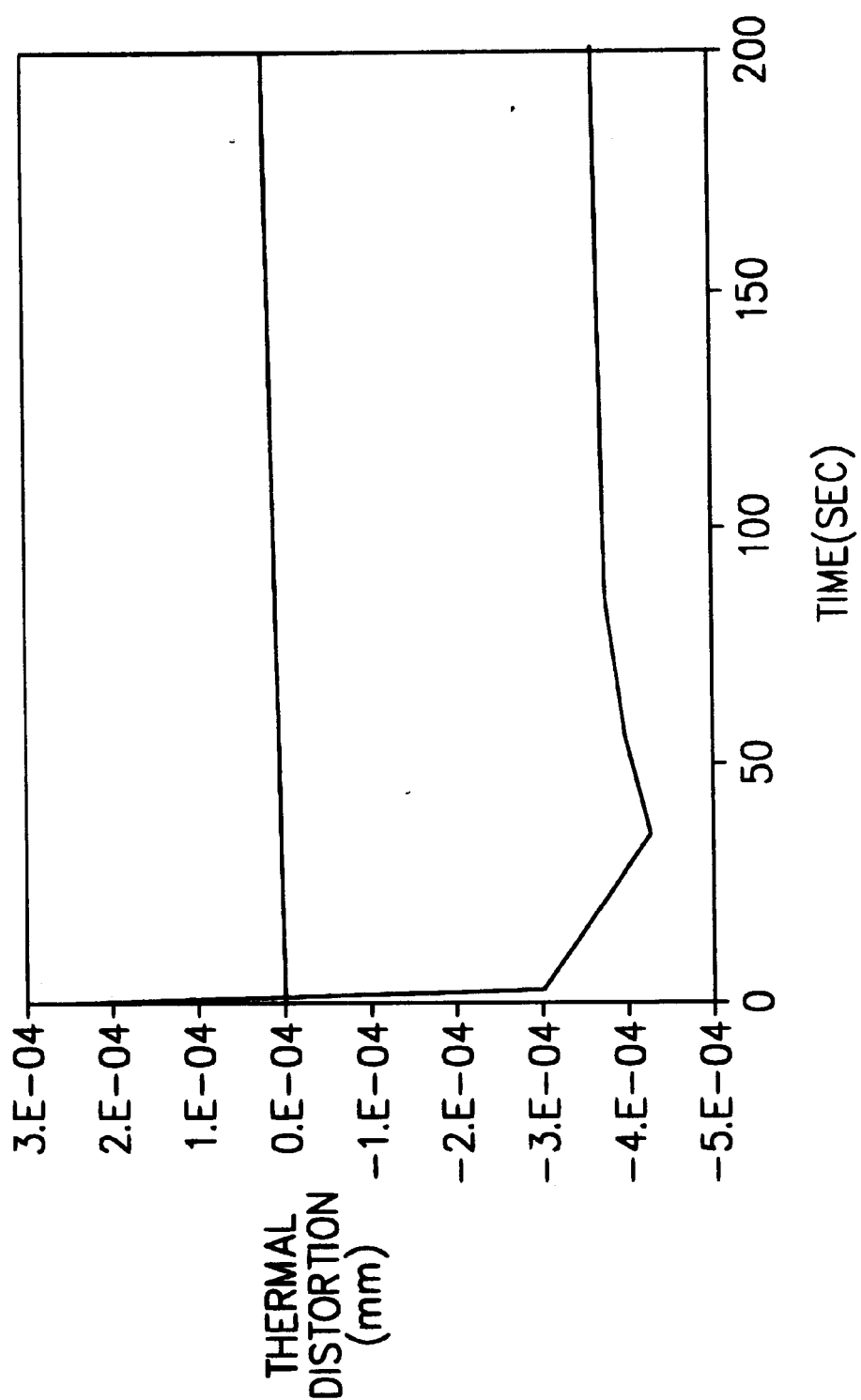
FIG. 7 is a graph illustrating a thermal distortion of the device for aligning an optical source and an optical fiber according to the embodiments of the conventional art.
Figure 8:
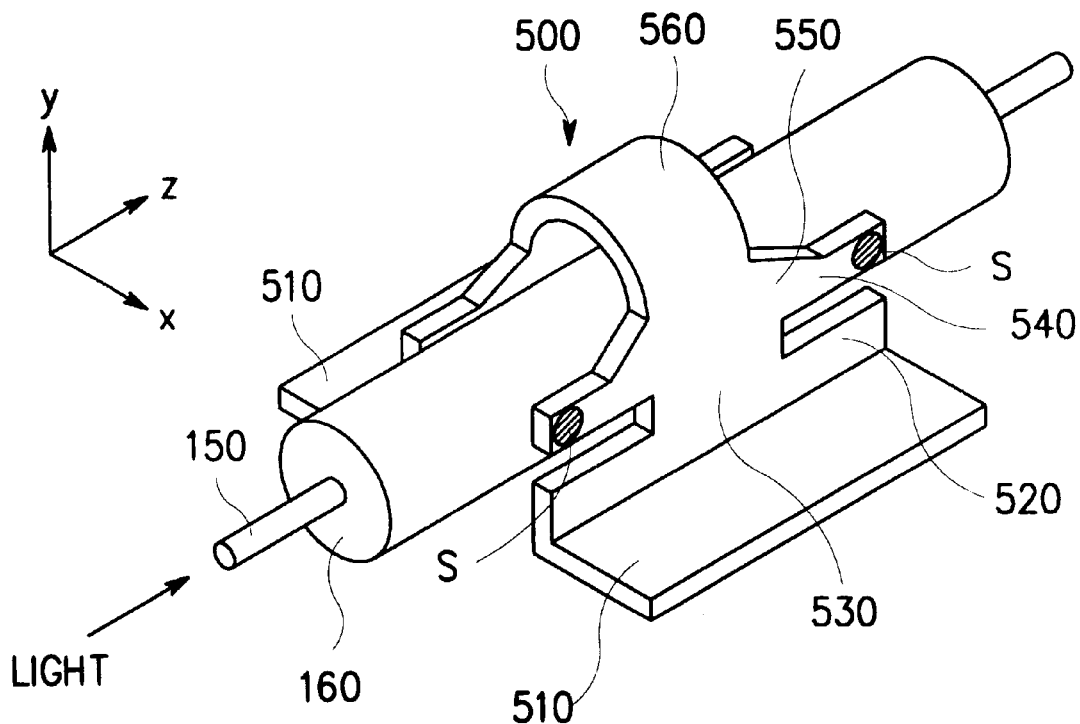
FIG. 8 is a perspective view illustrating an optical ferrule and a saddle of the inventive device for aligning an optical source and an optical fiber according to a preferred embodiment of the present invention.
Figure 9:
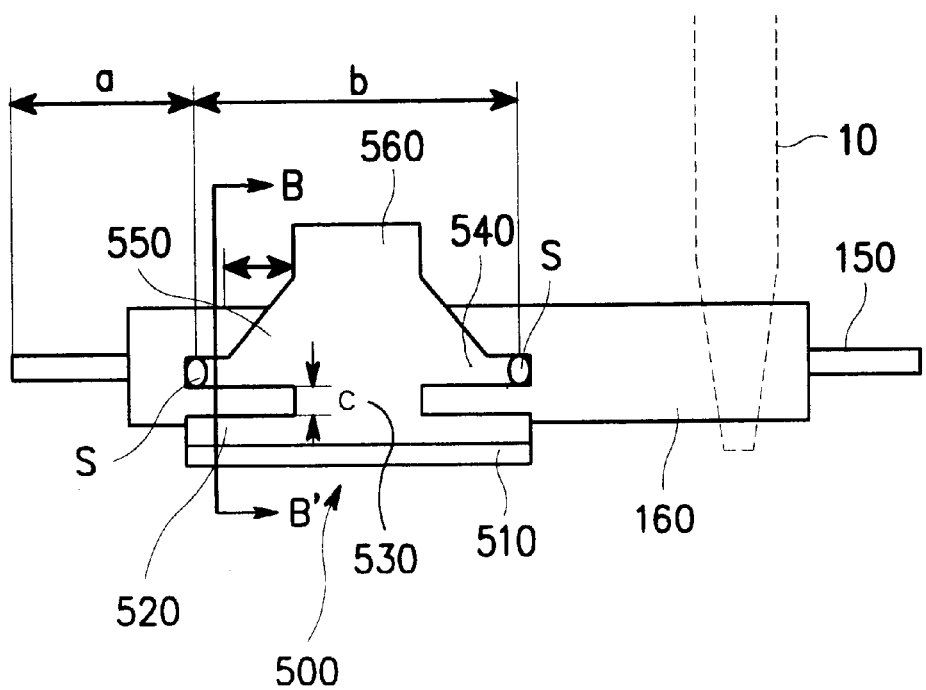
FIG. 9 is a side view magnifying the optical ferrule and a saddle of the inventive device for aligning an optical source and an optical fiber according to the preferred embodiment of the present invention.
Figure 10:
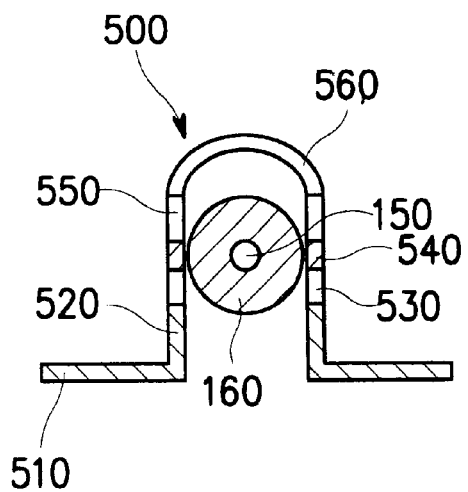
FIG. 10 is a view illustrating the cross-section line B-B' in FIG. 9.

FIG. 8 is a cross-sectional view illustrating an optical ferrule 160 and a saddle member 500 in an optical source module that is used for aligning an optical source and optical fiber 150 according to the preferred embodiment of the present invention. The optical source module includes a substrate (not shown); an optical light source (not shown) mounted on the substrate; an optical fiber 150 for receiving light emitted from the optical light source; an optical fiber ferrule 160 for supporting the optical fiber 150; and, a saddle member 500 mounted on the substrate for supporting the optical fiber ferrule 160. FIG. 9 is a side view of the optical ferrule and the saddle for aligning an optical source and an optical fiber according to the preferred embodiment of the present invention. FIG. 10 is a view illustrating the cross-section line B-B' in FIG. 9.

Referring to FIGS. 8 to 10, the saddle 500 of the inventive device for aligning an optical source and optical fiber according to the preferred embodiment of the present invention includes: a pair of elongated bases 510 spaced apart from each other in a parallel relationship so that the optical fiber ferrule 160 can be disposed between the bases 510; a sub rib 520 extending upwardly from the inside ends of the respective base 510 in a normal direction; a center rib 530 with a smaller width than the sub rib 520 extending upwardly from the center of the respective sub rib 520; an arm member 540 with a greater width than the center rib 530 extending from the respective center rib 530 and positioned near the optical fiber ferrule 160 along the center axis of the optical fiber ferrule 160, each arm 540 having a pair of welded sections S at both ends for coupling the optical fiber ferrule 160 thereto; a reinforcing member 550 with tapered side ends extending from the top end of the respective center rib 530; and, a loop member 560 having a bent shape coupled to the respective tapered end of the reinforcing member 550.

With reference to FIGS. 8, 9, and 10, the installation process of the saddle 500 according to the preferred embodiment of the present invention is performed in the following steps. First, the respective base 510 of the saddle 500 with the optical fiber ferrule 160 displaced therein are mounted on a substrate (not shown) using a displacement device 10. Next, an electric power is supplied to a laser diode (not shown) mounted on the substrate near the saddle 500. Then, the position of the optical fiber ferrule 160 is adjusted to determine a maximum light-receiving position. Once the maximum light-receiving position is determined, the welded sections S formed at the ends of the arms 540 are laser-welded to couple the saddle 500 to the optical fiber ferrule 160. The heat applied to the welded sections S of the arms 540 for coupling is conducted through the reinforcing sections 550, the center ribs 530, the loop 560, etc., through the arms 540. Also, the heat conduction and residual stress caused by the cooling process after welding are directed to the bases 510, e.g., vertically downward, are minimized because of the spacing, c, between the arms 540 and the sub ribs 520 as well as of the reinforcing sections 550.

On the other hand, detailed design values, e.g., the distance between one end 150 of the optical fiber and one end of the arm 540, the distance b between one end of one arm and the other end of the arm, the spacing c between the arm 540 and the sub rib 520 as well as the width d of the reinforcing section 550 may be determined through a simulation until a desired result is obtained. The contact points of the arms 540 and the sub ribs 520 may be formed to have a taper shape or a round shape for easy processing thereof.

In the embodiment, the same material for the substrate and optical fiber ferrule is used to prepare the saddle 500 to minimize thermal expansion and contraction during the welding process. The material preferably should have a lower linear expansion. For example, Ni, KOVAR, Fe—Ni alloy, and SUS3041 can be used as the material for the saddle.

Figure 11:
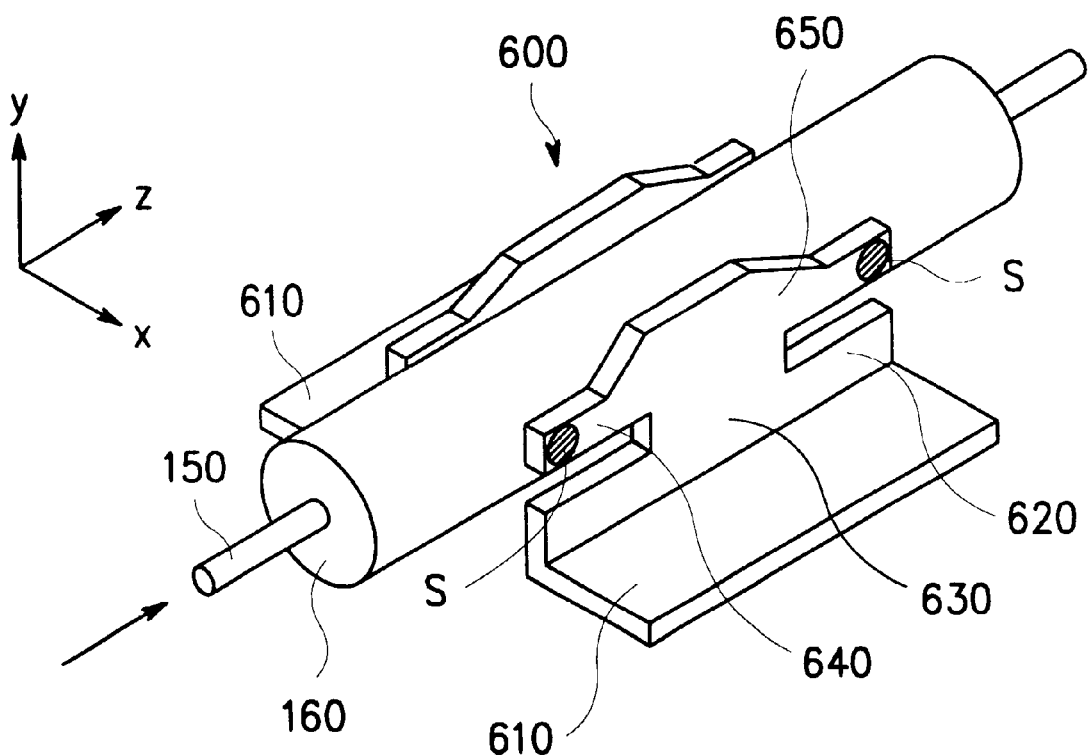
FIG. 11 is a cross view illustrating an optical ferrule and a saddle of the inventive device for aligning an optical source and an optical fiber according to another preferred embodiment of the present invention.
Figure 12:
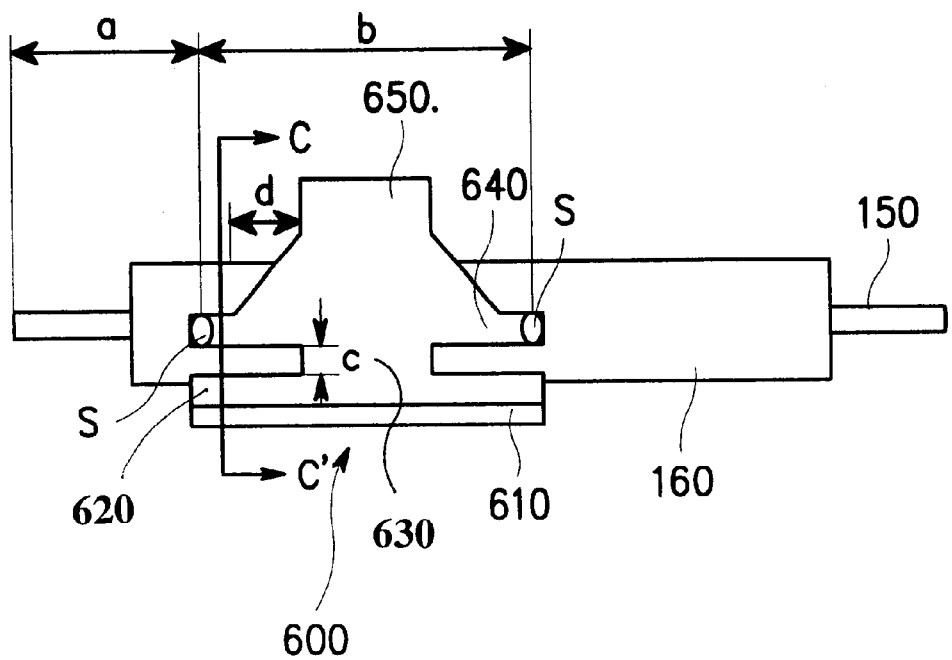
FIG. 12 is a side view illustrating an optical ferrule and a saddle according to another preferred embodiment of the present invention.
Figure 13:
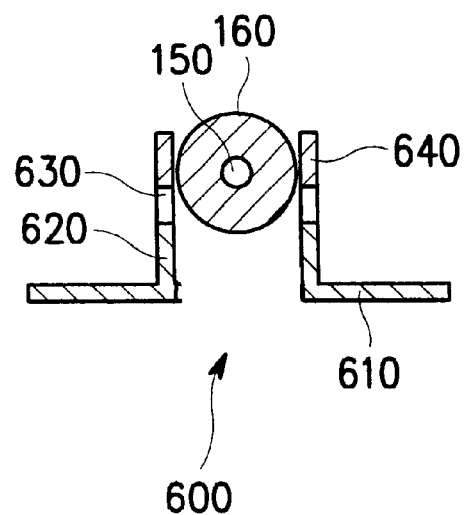
FIG. 13 is a view illustrating the cross-section line C-C' in FIG. 12.

FIG. 11 is a cross-sectional view illustrating an optical ferrule and saddle of the inventive device for aligning an optical source and an optical fiber according to a second preferred embodiment of the present invention. FIG. 12 is a side view illustrating the inventive device according to the second preferred embodiment of the present invention. FIG. 13 is a view illustrating the cross-section line C-C' in FIG. 12.

Referring to FIGS. 11 to 13, the saddle member 600 of the inventive device for aligning an optical source and an optical fiber includes: plate-shaped bases 610; a sub-rib member 620 spaced apart from each other and extending from the upper surface of the respective base 610 so that the optical fiber ferrule 160 can be inserted therebetween; a center rib 630 with a smaller width than the sub-rib member 620 extending upwardly from the respective center portion of the sub-rib member 620; an elongated arm 640 having welded section S for coupling the optical fiber ferrule 160 at each end of the arm 640, extending from the center ribs 630 in a vertical direction, and displaced along the longitudinal direction of the optical fiber ferrule 160; and a reinforcing member 650 with tapered side ends extending in a vertical direction from the respective the arm 64.

Unlike the first preferred embodiment of the present invention, the saddle member 600 of the second preferred embodiment of the present invention has bases 610 monolithic-structured without the loop member 560 of FIG. 8 for connecting the respective center ribs together.

The installation method of the saddle 600 according to the second preferred embodiment of the present invention is performed according to the following steps. First, the bases 610 are mounted on a substrate (not shown). An electric power is supplied to a laser diode (not shown) located on the same substrate; then the position of the optical fiber ferrule 160 is adjusted so as to determine a maximum light-receiving position. Once the maximum light-receiving position is determined, the welded sections S formed at the ends of the arms 640 are laser-welded to couple the saddle 600 to the optical fiber ferrule 160. Here, the heat applied to the welded sections S of the arms 640 is conducted through the reinforcing sections 650, the center ribs 630, etc., through the arms 640. The heat conduction and residual stress directed to the bases 610, e.g., vertically downward, are minimized because of the spacing c between the arms 640 and the sub ribs 620 as well as the reinforcing sections 650.

On the other hand, the numeric values of the detailed design, e.g., a distance a between one end 150 of the optical fiber and one end of the arm, a distance b between one end of the arm and the other end of the arm, a spacing c between the arm and the sub rib as well as a width d of the reinforcing section may be determined through a test or simulation to obtain a desired result. The contact positions between the arms and the sub ribs are formed to have a taper shape or a round shape for easy processing thereof.

The same material as the substrate and the optical fiber ferrule is used for the saddle as in the first preferred embodiment of the present invention to minimize the welding and the thermal distortion. The material has preferably a lower linear expansion. For example, Ni, KOVAR, Fe—Ni alloy, and SUS3041 are used as the material of the saddle.

Figure 14:
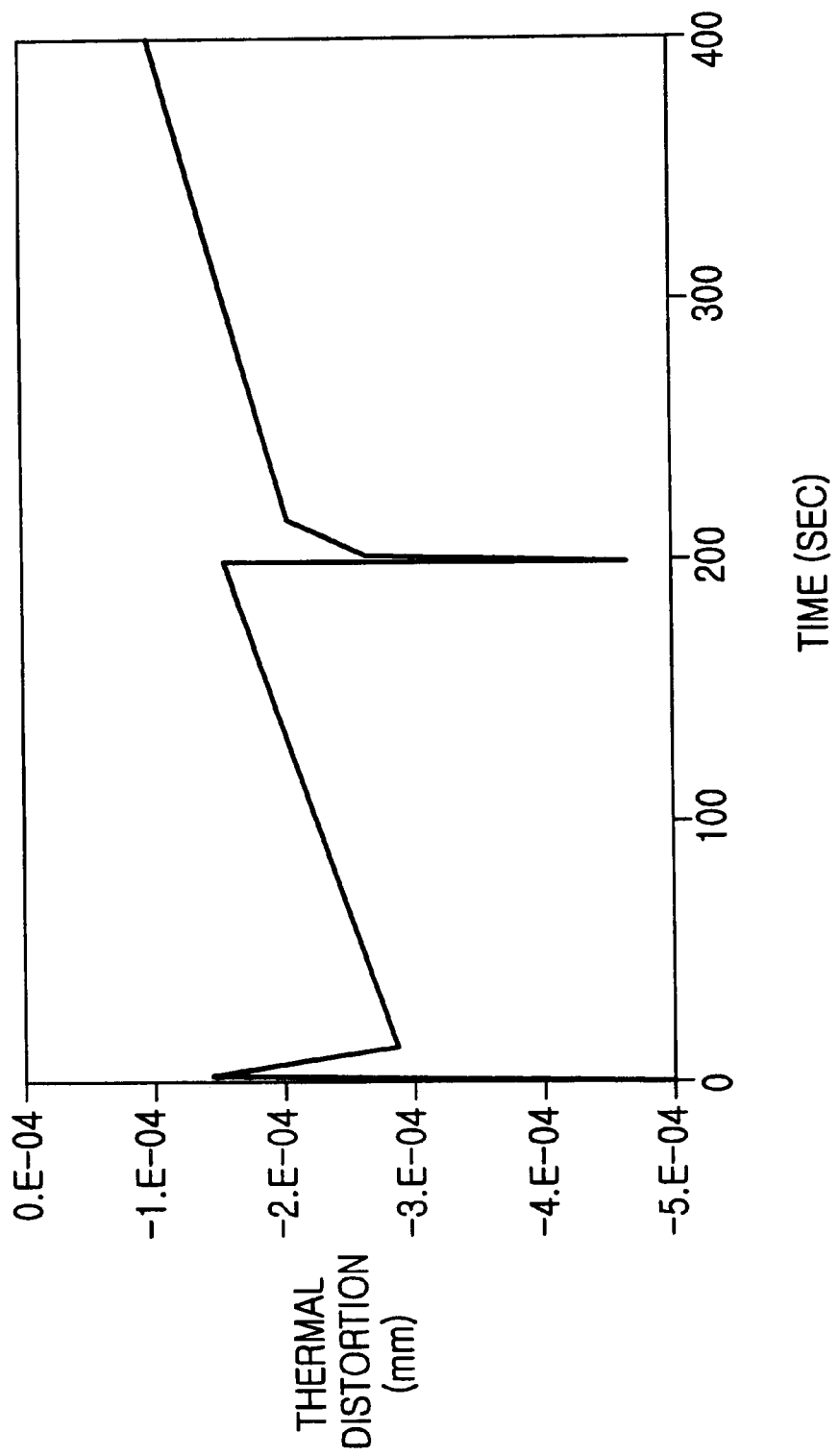
FIG. 14 is a graph illustrating a thermal distortion of the inventive device for aligning an optical source and an optical fiber according to the preferred embodiments of the present invention.

FIG. 14 is a graph illustrating the thermal distortion result obtained through the inventive device according to the first and second embodiments of the present invention. The horizontal axis represents time, and the vertical axis represents the degree of the thermal distortion. As shown in FIG. 14, the welded sections S of the inventive device for aligning an optical source and an optical fiber exhibits a lower thermal distortion of 0.02 $\mu$m, which is much smaller than the prior art system, which exhibited thermal distortion of 0.4 $\mu$m. Accordingly, the inventive device can maintain an alignment precision within the allowable error range that is less than 0.2 $\mu$m, thus allowing optical coupling efficiency between the optical source and the optical fiber to be higher than 95%. As a result, it is possible to obtain the optical source module having a higher capacity than the conventional optical source module.

As stated above, the device for aligning an optical source and an optical fiber according to the preferred embodiments of the present invention has advantages of maintaining a higher optical coupling efficiency between the optical source and the optical fiber as well as securing a long-term durability of the optical source module by minimizing the thermal distortion and residual stress caused by the welding of the optical fiber ferrule and the saddle.

While the invention has been shown and described with reference to certain preferred embodiments thereof, it will be understood by those skilled in the art that various changes in form and details may be made therein without departing from the spirit and the scope of the invention as defined by the appended claims.

What is claimed is:

1. A device for aligning an optical source and an optical fiber in an optical source module, which includes a substrate for mounting said optical source, an optical fiber ferrule for supporting said optical fiber so that said optical fiber can receive light emitted from said optical source, and a saddle mounted on the substrate near said optical source for supporting said optical fiber ferrule, comprising:

said saddle comprising:
a pair of base layers spaced a part by a predetermined distance;
a sub-rib member near extending upwardly from the inner end, adjacent to said optical fiber ferrule, of said respective base layer;

a center-rib member having a smaller width than said sub-rib layer extending upwardly from the center portion of said respective sub-rib layer;

an arm member having a greater width than said center rib extending upwardly from the top of said respective center-rib member, said respective arm member having a pair of welded area positioned at both ends for coupling said optical fiber ferrule along a longitudinal direction of said optical fiber ferrule;

a reinforcing member having tapered ends extending upwardly from the top portion of said respective arm member; and, a loop member for coupling the top end of said respective reinforcing member together.

2. The device of claim 1, wherein said saddle is composed of the same material as said substrate and said optical fiber ferrule.

3. A device for aligning an optical source and an optical fiber in an optical source module, which includes a substrate for mounting said optical source, an optical fiber ferrule for supporting said optical fiber so that said optical fiber can receive light emitted from said optical source, and a saddle mounted on the substrate near said optical source for supporting said optical fiber ferrule, comprising:

said saddle comprising:

a pair of base layers spaced a part by a predetermined distance;

a sub-rib member near extending upwardly from the inner end, adjacent to said optical fiber ferrule, of said respective base layer;

a center-rib member having a smaller width than said sub-rib layer extending upwardly from the center portion of said respective sub-rib layer;

an arm member having a greater width than said center rib extending upwardly from the top of said respective center-rib member, said respective arm member having a pair of welded area positioned at both end for coupling said optical fiber ferrule along a longitudinal direction of said optical fiber ferrule; and, a reinforcing member having tapered ends extending upwardly from the top portion of said respective arm member.

4. The device of claim 3, wherein said saddle is composed of the same material as said substrate and said optical fiber ferrule.

* * * * *